United States Patent

Preissinger et al.

[15] 3,648,339
[45] Mar. 14, 1972

[54] METHOD OF MAKING IMPREGNATED CAPACITOR

[72] Inventors: Heinz Preissinger; Reiner Simson, both of Muenchen, Germany

[73] Assignee: Siemens Aktiengesellschaft, Berlin and Munich, Germany

[22] Filed: May 1, 1970

[21] Appl. No.: 33,773

[30] Foreign Application Priority Data

May 5, 1969 Germany .................. P 19 22 822.9

[52] U.S. Cl. ............................................29/25.42, 317/258
[51] Int. Cl. ..................................................H01g 13/04
[58] Field of Search ..........................317/260, 258; 29/25.42

[56] References Cited

UNITED STATES PATENTS 2,935,668  5/1960  Robinson .........................317/260 X
3,346,789  10/1967  Robinson .........................317/258
3,531,699  9/1970  Peck .................................317/258

FOREIGN PATENTS OR APPLICATIONS 106,535  2/1939  Australia .........................317/260

Primary Examiner—E. A. Goldberg
Attorney—Hill, Sherman, Meroni, Gross & Simpson

[57] ABSTRACT

An impregnated capacitor which has a coiled body of alternate layers of plastic dielectric foils and charge-carrying elements characterized by the outer or convex surfaces of the charge-carrying elements being rougher than the inner or concave surface to facilitate the flow of an impregnating material through the coiled body. The process for making the capacitor includes heating the coiled body prior to impregnation to shrink the dielectric foil to increase the space between each of the concave surfaces and its adjacent dielectric layer and to decrease the spacing between each of the convex surfaces and its adjacent dielectric layer, then impregnating the coiled body to fill all the spaces or gaps between the layers.

3 Claims, 2 Drawing Figures

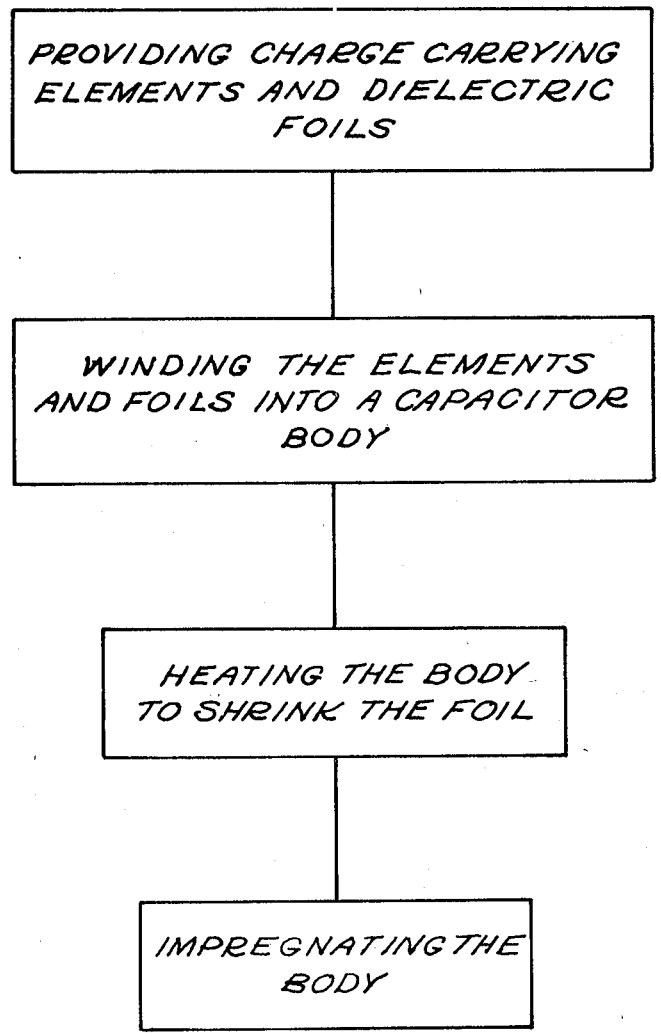

METHOD OF MAKING IMPREGNATED CAPACITOR

BACKGROUND OF THE INVENTION

1. Field of the Invention

The present invention relates to an impregnated electrical capacitor having a coiled capacitor body and method of producing the capacitor.

2. Description of the Prior Art

In direct voltage capacitor, plastic sheets have been used to a great extent as a dielectric. In alternating current capacitor especially those used with normal current frequencies, paper impregnated with insulating oil have been used as the primary dielectric. In U.S. Pat. No. 3,363,156, a wound or coiled capacitor, which has dielectric layers consisting of both a plastic foil and a paper impregnated with insulating oil, is disclosed and this type of capacitor can be thoroughly impregnated throughout the coiled body.

A wound or coiled capacitor having a dielectric of a plastic foil and using metal foils as the charge-carrying elements has been proposed; however, a thorough impregnation of the coiled body has been difficult to achieve. The problems of impregnation are attributed to the smoothness of both the plastic dielectric foil and the metal foils of the charge-carrying elements which smoothness provides very small airgaps and spaces between the layers. At the beginning of the impregnating process, the impregnating agent first penetrates between the layers and the plastic foil, adjacent the end of the coil edge, becomes swollen and restricts the flow of the impregnating agent or fluid into the center of the coil and thus prevent a complete and thorough penetration of the agent.

In a copending application, Behn et al., U.S. Pat. application No. 856,220, filed Sept. 8, 1969, a continuation of U.S. Pat. application No. 689,493, now abandoned, a selfhealing capacitor was disclosed in which an impregnated dielectric layer consists of a thin plastic foil, especially polypropylene foil, and the charge carrying elements were paper bands metallized on both sides. The impregnating agents cause the plastic foils to swell and thus fill any spaces or gaps between the charge-carrying element and the foil. However, the capacitor of this type still requires a relatively long time for impregnating and the capacitor body had to be immersed for a long time in the oil bath in order for a complete impregnation to be achieved.

The time for impregnating a coiled capacitor body is dependent upon the winding conditions of the coiled capacitor. For example, it is desirable in the case of a rechargeable or selfhealing capacitor to wind the capacitor layers with a minimum pressure on account of the winding stability, capacitance constancy, the avoidance of void formations and corona discharge phenomena, and in order to achieve an extinguishing time for a breakdown spark. However, the minimum pressure for winding can be so high that a faultless thorough impregnation of the capacitor is possible only after a long impregnating time.

SUMMARY OF THE INVENTION

The present invention provides a capacitor having a wound capacitor body comprising a coiled charge-carrying element separated from each other by plastic dielectric foils and a method of forming the capacitor which reduces the time necessary for obtaining a complete and further impregnation of the capacitor body. Each of the charge-carrying elements is a paper band having a rough surface and a smooth surface with both of the surfaces metallized to form surface layers which are electrically interconnected. In winding the capacitor body, the dielectric foils and the charge carrying elements are wound with the rough surface being the convex or outer surface and the smooth surface being the concave or inner surface of each wound layer of the charge-carrying elements. Subsequent to the winding and prior to the impregnation, the coiled capacitor body is heated to shrink the plastic dielectric foils to increase the spacing between the smooth concave surface and its adjacent layer of dielectric foil and to decrease the spacing between the rough convex surface and the adjacent layer of dielectric foil. After heating the coil is impregnated with the desired material to fill the gaps and spaces between the dielectric foils and the charge-carrying elements and preferably the impregnating material causes swelling of the layers of plastic dielectric foil to fill the gaps with the speed of the swelling being increased by heating the capacitor body to an elevated temperature.

BRIEF DESCRIPTION OF THE DRAWINGS

FIG. 2 illustrates a flow chart of the method of the present invention for producing the capacitor body.

DESCRIPTION OF THE PREFERRED EMBODIMENT

Figure 1:
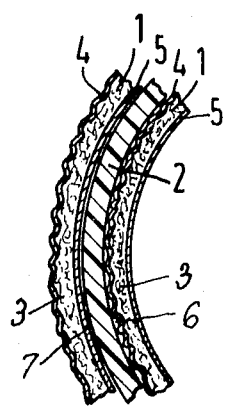
FIG. 1 illustrates a portion of a cross section of a coiled capacitor body of the present invention.

The principles of the present invention are particularly useful when employed in a coiled capacitor having a wound body of a pair of electrodes or charge-carrying elements 1, with the layers being separated from each other by layers of plastic dielectric foils 2. Each of the charge-carrying element 1 is illustrated as a paper band 3 having metallized surface layers 4 and 5 which are electrically interconnected at an edge of the band or through pores in the paper band so that the charge placed on either layer 4 or 5 is the same. The dielectric foil 2, which is superimposed between the layers of the electrodes 1, consists of plastic material which is shrinkable at an elevated temperature and which when contacted by the impregnating agent such as mineral oil will swell into tight contact with the adjacent metallized surface layers 4 and 5 of the adjacent electrodes 1. A preferred material for the dielectric foil is a polypropylene foil, which by reason of the method of its formation has been stretched a predetermined amount or degree so that it will shrink at an elevated temperature. For example at an elevated temperature of about 120° C., a polypropylene foil has a shrinkage of about 6.5 percent.

As illustrated, the metallized layer 4 is substantially rougher than the metallized layer 5. To obtain the difference in the roughness in the metallized layers 4 and 5, the paper band 3 has one surface rougher than the other surface. A metallic coating or surface layer is applied to the surfaces 4 and 5 of the electrode 1 by any conventional metallizing process such as vapor depositing of the metal on the surface of the paper band.

In order to obtain the accelerated, thorough and complete impregnation of the capacitor body, the electrodes 1 and the dielectric foils 2 are wound in a direction to form the coil body so that the rough metallized surface layer 4 is on the outer or convex surface and the smooth surface layer 5 is on the inner or concave surface of the wound coil. In the wound condition, the spacing between the metallized surface layer 4 and the dielectric foil 2 has a gap identified by the numeral 6 and the metallized surface layer 5 has a gap or spacing 7 between it and the foil 2. Since the layer 4 is rougher than the layer 5, the spacing or size of the gap 7 is smaller than the gap 6.

Subsequent to the winding of the electrodes 1 and the interposed dielectric foils 2, as illustrated in the flow chart of FIG. 2, the wound coil is heated to a predetermined temperature for drying the capacitor body or for the other heat treatment purposes and the plastic dielectric foil 2 shrinks during the heating step at the elevated temperature. Since the electrodes 1, consisting of the paper band 3 and the two metallized layers 4 and 5, are relatively rigid, the shrinking of the foil or dielectric foil 2 causes a decrease in the airgap 6 and the pulling away or increasing of the size of the airgap 7. Thus the heat treatment causes the shrinkage of the dielectric foil 2 to increase the size of the airgap 7 between the concave surface and the dielectric foil 2 while decreasing the size of the airgap or space 6 between the dielectric foil 2 and the convex or outer layer formed by the rough metallized layer 4. The heating step to shrink the plastic foil 2 changes the size of the two gaps on both sides of the dielectric foil to form penetration passages of a sufficient size to permit a rapid and accelerated impregnation of the coiled capacitor body.

If the electrodes 1 and plastic foils 2 were wound in a direction so that the rough surface layer 4 were the concave or inner surface, the airgap or space 7 would be larger than the airgap or space 6. The heating step to cause shrinkage of the wound or coiled capacitor body would increase the size differential between the gaps 7 and 6 with the gap 6 being probably too restricted to provide a sufficient penetration passage for the impregnating fluid or material.

If the impregnating agent or fluid causes the dielectric to swell, then the airgaps 6 and 7 which are filled by the impregnating agent are subsequently filled by the swollen plastic foil 2 to remove any voids or air spaces. Preferably, as mentioned in the above-mentioned copending application, the impregnating is carried out at a low temperature to prevent the rapid swelling of the plastic dielectric foil. Subsequent to the completion of the impregnating step with penetration completely through the coiled body, the wound impregnated body is heattreated to increase the speed of swelling of the dielectric foil.

To provide bands 3 having the desired properties for the capacitor, the paper bands preferably have a finish degree in a range of A, B or C and particularly and desirably have a finish degree A. The finish degree is a statement of the density of the paper used for the bands 3. A finish degree A corresponds to a density of 1.2 g./cm.$^3$; finish degree B corresponds to a density of 1.1 g./cm.$^3$; and finish degree C corresponds to a density of 1 g./cm.$^3$. Thus, the range of density for the paper is between 1 and 1.2 g./cm.$^3$.

In the above discussion it is mentioned that one surface of the paper was rougher than the other surface. The roughness of a surface can be measured by a gloss degree device and several types of the devices are known in the art. Since a rougher paper surface scatters the light beam more than a relatively smooth surface, a measurement of the intensity of the reflexed light beam of a given intensity from two surfaces provide a relative indication of roughness of the surfaces. The difference in the surfaces of the paper bands 3 is preferably a difference factor of 1.7 when determined by a gloss degree meter used in the following manner. The paper is placed on a nonreflecting background and a beam of parallel light from an optical system is projected on the surface of the paper at an angle of incidence of 45°. Measuring devices such as photoelectric cells are placed to measure the intensity of the light reflexed at an angle of reflection of 45° from the surface of the paper. By comparing the measurements for both surfaces of the paper bands 3, a relative difference factor is obtained to determine the relative roughness or smoothness of the surfaces 4 and 5.

While the description of the capacitor structure and the method of forming the capacitor was directed to a type in which the plastic dielectric foil is swollen by the impregnating fluid or material, the capacitor structure and method can be utilized for those type of capacitors in which the impregnating agent fills the airgaps and does not react or cause swelling of the dielectric foil. In forming such a capacitor, the step of heating the impregnated capacitor to cause the swelling of the dielectric foil to fill the airgaps would not be required and is eliminated.

Although various minor modifications might be suggested by those versed in the art, it should be understood that we wish to embody within the scope of the patent warranted hereon all such modifications such as reasonably and properly come within the scope of our contribution to the art.

We claim as our invention:

1. A method of producing an impregnated electrical capacitor body comprising the steps of
   providing a pair of charge-carrying elements, each element being a paper band having a smooth surface and a rough surface with both surfaces being metallized to provide surface layers which are electrically interconnected:
   providing dielectric foils of plastic material, which material is shrinkable at an elevated temperature;
   winding the charge-carrying elements and the dielectric foils into a capacitor coil at a predetermined degree of coil tightness to form a coiled capacitor body with a dielectric layer separating adjacent wound layers of the charge-carrying elements, said winding being in a direction so that the rough surface of the charge-carrying element is the convex surface of each wound layer of the charge-carrying elements;
   heating the coiled capacitor body to cause shrinkage of the dielectric foil to increase the spacing between the smooth surface of the charge-carrying element and the surface of the adjacent dielectric foil and to decrease the spacing between the rough surface of the charge-carrying element and its adjacent dielectric foil; and
   subsequently impregnating the coiled capacitor body with an impregnating material to fill the spaces and gaps between the surfaces of the charge-carrying elements and the adjacent surfaces of the dielectric foils to remove any airgaps and voids therebetween.

2. A method according to claim 1 wherein the dielectric material is a polypropylene plastic material and wherein the heating step is carried out at an elevated temperature of approximately 120° C.

3. A method according to claim 1 wherein the dielectric foil is a material which swells when contacted by the impregnating material and wherein said method includes the step of heat-treating the impregnated coiled capacitor body to cause swelling of the dielectric foils into tight engagement with the surfaces of the charge-carrying elements.

* * * * *